United States Patent [19]

Conta et al.

[11] Patent Number: 4,783,670

[45] Date of Patent: Nov. 8, 1988

[54] INK JET PRINT HEAD AND MANUFACTURE THEREOF

[75] Inventors: Renato Conta, Ivrea; Vincenzo Perucca, Banchette, both of Italy

[73] Assignee: Ing. C. Olivetti & C., S.p.A., Ivrea, Italy

[21] Appl. No.: 19,198

[22] Filed: Feb. 26, 1987

[30] Foreign Application Priority Data

Feb. 26, 1986 [IT] Italy .............................. 67150 A/86

[51] Int. Cl.⁴ .............................................. G01D 15/16

[52] U.S. Cl. .................................. 346/140 R; 29/760; 29/856; 400/126

[58] Field of Search ............. 346/1.1, 140 PD, 140 R, 346/75; 29/25-35, 760, 856; 400/126

[56] References Cited

U.S. PATENT DOCUMENTS

| | | | |
|---|---|---|---|
| 3,683,212 | 8/1972 | Zoltan | 310/8.3 |
| 4,366,490 | 12/1982 | DeBonte et al. | 346/140 |
| 4,379,304 | 4/1983 | Heinzl et al. | 346/140 |
| 4,493,137 | 1/1985 | Bader et al. | 346/140 PD |
| 4,528,578 | 7/1985 | Balbo | 346/140 |
| 4,528,579 | 7/1985 | Brescia | 346/140 |
| 4,546,361 | 10/1985 | Brescia et al. | 346/140 |
| 4,623,904 | 11/1986 | Conta et al. | 346/140 PD |
| 4,630,072 | 12/1986 | Scardovi et al. | 346/140 |
| 4,675,043 | 6/1987 | Conta et al. | 65/160 |
| 4,689,641 | 8/1987 | Scardovi et al. | 346/140 |

OTHER PUBLICATIONS

Encyclopedia Britannica, Library Research Service, Chicago, Ill., "*Flexible Printed Circuits*", pp. 1-4, 1/1972.

*Primary Examiner*—E. A. Goldberg
*Assistant Examiner*—Huan H. Tran
*Attorney, Agent, or Firm*—Banner, Birch, McKie & Beckett

[57] ABSTRACT

The head comprises a hollow body (21) carrying a series of capillary tubes (12) of rigid material, on to each of which is fixed a sleeve-type piezoelectric transducer (16). A resin (26) is injected into the hollow body so as to encase first portions of the transducers. A flexible printed circuit (28) is connected to another portion (26) of the transducers, the circuit having a series of pairs of conducting areas hot-soldered to two conducting terminals disposed on the outside surfaces of the transducers. The printed circuit (28) is fixed between the hollow body (21) and an intermediate block (35) which is closed by means of a sealing diaphragm (38), having a series of sleeves (40) which are a close fit on the ends of the capillary tubes remote from the nozzles. For manufacture of the head, the resin is injected by positioning the hollow body (21) in an apparatus comprising a support frame for the hollow body and a transverse member provided with a plurality of reference holes for receiving and precisely positioning the ends (13) of the capillary tubes (12) which carry the nozzles. The frame is provided with a series of seats for receiving the opposite ends of the capillary tubes. The seats are closed by a resilient strip having a series of holes which are a close fit on the portions of the transducers which are to remain free from the resin.

13 Claims, 3 Drawing Sheets

INK JET PRINT HEAD AND MANUFACTURE THEREOF

BACKGROUND OF THE INVENTION

The present invention relates to a multi-nozzle ink jet print head in which each nozzle is carried by a capillary tube of substantially rigid material on which a sleeve-type piezoelectric transducer is fitted, comprising a hollow body for carrying the capillary tubes, in which a first portion of the transducers is enclosed in a resin capable of holding the nozzles in a fixed position with respect to the hollow body.

The invention further relates to a method of manufacture of such a print head and an apparatus which can be used in a phase of the manufacturing method.

Multi-nozzle print heads are known in which the various transducers are enclosed in a single body made of resin. In such heads, the capillary tube is normally formed by the transducer, in part, while the remainder of the capillary tube and the associated nozzle are formed directly in the resin, for example by means of suitable cores. However the nozzles of such heads are not very precise and they suffer from rapid deterioration in use, so that the preference is normally to use capillary tubes which are prefabricated from metal material or glass, with the sleeve-like transducers being a close fit thereon or being fixed thereon by means of glue or resin.

In such heads therefore, positioning of the individual capillary tubes requires a high degree of precision, both with respect to the body of the head and with respect to parallelism and relative positioning with respect to each other. In addition the electrical connection of the various transducers to their control circuit makes the head complicated and expensive to build.

SUMMARY OF THE INVENTION

The object of the present invention is to provide a print head having a plurality of nozzles with a very high degree of accuracy, which is simple and inexpensive to manufacture.

To this end, the invention provides a print head which is characterised in that the transducers are controlled by way of a flexible printed circuit having a series of pairs of areas soldered to two conducting terminals disposed on the outside surface of another portion of the transducers, the printed circuit being fixed to the hollow body by means of a hollow block connected to the hollow body and capable of protecting the said other portions of the transducers.

Other features and advantages of the invention will be more clearly apparent from the following description of a preferred embodiment which is given by way of non-limiting example with reference to the accompanying drawings.

DESCRIPTION OF THE PREFERRED EMBODIMENTS

Figure 1:
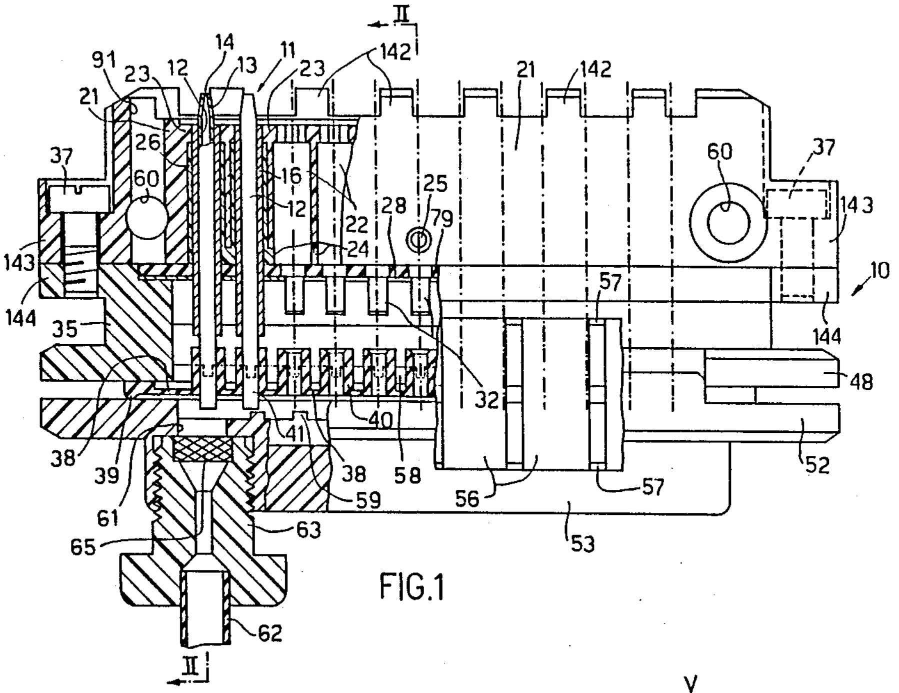
FIG. 1 is a partly sectional plan view of an ink jet print head according to the invention.

The print head essentially comprises a rigid support which is generally indicated at 10 of non-deformable plastics material, for example Macrolon which is produced by Bayer A.G.

Twelve print elements 11 are contained in the support 10, each being formed by a cylindrical capillary tube 12 of rigid material, for example glass. Each tube 12 terminates at its front end in a tapering portion 13 provided with a nozzle 14.

Figure 3:
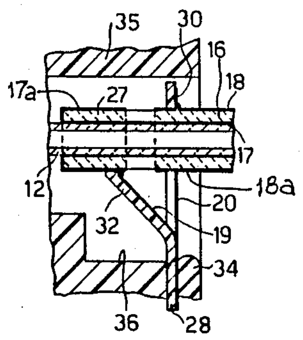
FIG. 3 is a detail from FIG. 2 on an enlarged scale.

A transducer formed by a sleeve 16 of piezoelectric material is a close fit on and glued to each capillary tube 12. The inside and outside surfaces of the sleeve 16 are covered with a metal layer 17 and 18 (see FIG. 3), the terminals 17*a*, 18*a* of which are carried by the outside surface of the transducer 16: the inner layer 17 is carried round on to the rear end of the sleeve 16 to form its terminals. The terminals are connected to two corresponding electrical conductors 19 and 20, as will be more clearly seen hereinafter.

Figure 4:
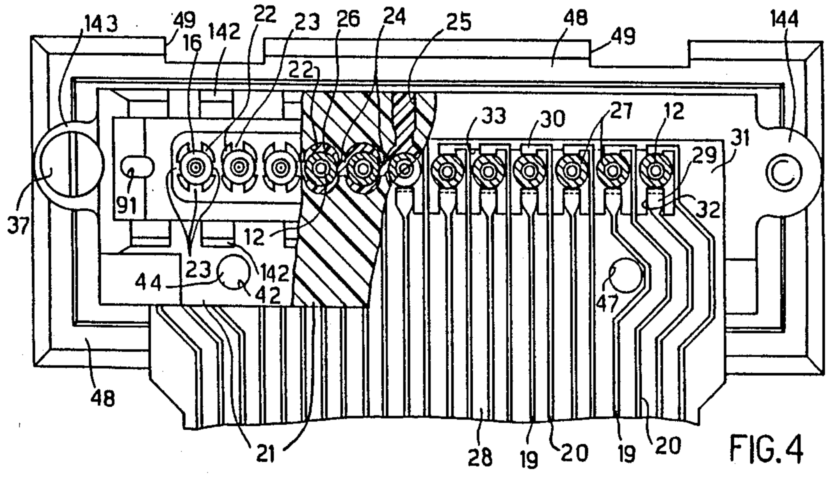
FIG. 4 is a partly sectional front view of the head shown in FIG. 1.

The support 10 (see FIGS. 1 and 2) comprises a substantially prismatic hollow body 21 provided with twelve cylindrical seats 22 of oval section (see FIG. 4). The axes of the seats 22 are parallel and are disposed in a single plane parallel to the relative movement envisaged between the paper and the print head, whereby all the print elements 11 are capable of printing on a single line of printing. The axes of the seats 22 and thus of the print elements 11 are disposed of constant spacings, for example of 2.54 mm, whereby the head can be controlled for simultaneously printing a row of twelve alphanumeric characters. Alternatively the seats 22 may be disposed in a plane which is inclined with respect to the movement relative to the paper, in such a way that each print element prints on a corresponding elementary row of the matrix of characters. In that case the spacing between the print elements is the horizontal projection of the effective spacing.

Each seat 22 terminates at one end with four projections 23 for guiding the front end of the corresponding transducer 16 with a certain degree of approximation. The opposite ends of the seats 22 are in communication with each other by way of a series of conduits 24. At a location corresponding to one of the seats 22, the body 21 is provided with a hole 25 disposed substantially in the same plane as the conduits 24 and having its axis perpendicular to the seat 22.

The transducers 16 of the tubes 12 (see FIGS. 1 and 2) are enclosed in the seat as 22 by means of a resin 26 which is injected by way of the hole 25, as will be described in greater detail hereinafter. The print elements 11 thus form with the body 21 a single block, with the tapering portions 13 of the tubes 12 projecting therefrom at one side while projecting from the other side are portions 27 (see FIG. 2) of the transducers 16 for connection of the terminals of the two layers 17 and 18 to the associated conductors 19 and 20 (see FIG. 3).

Two projections 142 are disposed on the front surface of the body 21 (see FIGS. 1 and 2), in a position corresponding to each pair of tubes 12, the projections 142 providing protection for the tapering portions 13 while permitting accessibility thereto.

The pairs of conductors 19 and 20 (see FIG. 4) are produced by means of conducting material on a printed circuit having a flexible strip of ribbon 28 as its carrier. The conductors 19 terminate in the vicinity of one edge 31 of strip 28 with a series of areas 29 which are connected to the conductors 19 while the conductors 20 terminate with another series of areas 30 connected to the conductors 20. The areas 29 are each carried by a bendable tongue portion 32. The portions 27 (see FIG. 3) of the transducers 16 are fitted into the opening 33 provided by the bent tongue portions 32 in such a way that the areas 29 and 30 are brought into contact with the terminals of the two layers 17 and 18 to which they are then soldered, as will be described hereinafter.

The ribbon 28 (see FIG. 2) is pinched between a seal 34 of resilient insulating material and an intermediate block 35 also of Macrolon. The block 35 has an internal space 36 for accommodating the portions 27 of the transducers and the edge 31 of the strip 28. The block 35 is fixed to the body 21 by means of two screws 37 (see FIG. 1) which connect two bored projections 143 on the body 21 to two bored projections 144 on the block 35.

The space 36 (see FIG. 2) in the intermediate block 35 comprises at its rear a region 145 which extends downwardly. The region 145 is closed by a rectangular diaphragm 38 of impermeable resilient material, for example butyl rubber. The diaphragm 38 has an edge portion 39 of increased thickness to permit the region 145 to be sealed off. The diaphragm 38 integrally carries a series of sleeves 40 which are a close fit on the end portions 41 of the tubes 12 which project from the portions 27 of the transducers so that it is also sealed to the capillary tubes 12, in regard to the region 145.

The body 21 is provided with a pair of holes 42 (see FIG. 2) which can be aligned with two holes 43 in the intermediate block 35 so as to be held in position by two reference pins 44 before being locked together by the screws 37. The pins 44 pass through two corresponding holes 46 provided in the seal 34 and two holes 47 (see FIG. 4) provided in the strip 28.

Figure 5:
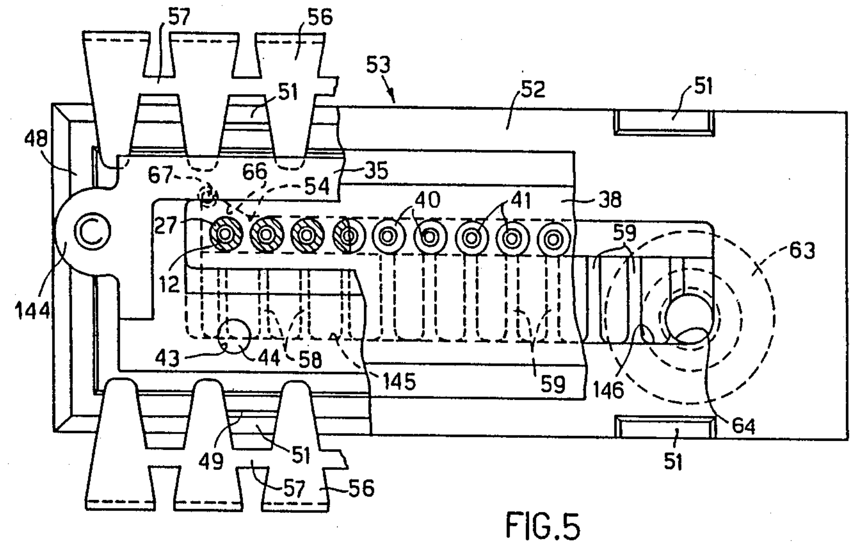
FIG. 5 is a view in section taken along line V—V in FIG. 2.

The intermediate block 35 has a flange 48 (see FIG. 2) against which the edge portion 39 of the diaphragm 38 bears. The flange 48 is provided with four openings 49 (see also FIGS. 4 and 5) into which engage the same number of projections 51 which project from a flange 52 of a rigid cover 53. The cover 53 has a space 54 which extends towards a region 146 facing the region 145. The space 54 is capable of containing an amount of ink such as to permit proper operation of the print head.

The two flange 48 and 52 are held together by two series of clip-type leaf springs 56 (see FIGS. 2 and 3) which are prestressed in such a way as to ensure a perfect seal as between the space 36 and the space 54, by way of the edge portion 39 of the diaphragm 38. Each spring is of a C-shaped configuration and the various springs are connected together by two bar members 57. Finally the body 21 has two holes 60 (see FIG. 1) for connection to the carriage of a printer.

The diaphragm 38 also performs the function of absorbing the pressure waves in the ink which are generated in the space 54 by virtue of the variation in speed of the head during the printing operation and in particular due to the reversals of movement of the head. The surface of the region 145 of the space 36 which faces towards the diaphragm 38 is provided with a series of ribs 58 and the surface of the region 146 of the space 54 which faces towards the diaphragm 38 is also provided with a series of ribs 59. The ribs 58 and 59 are provided to prevent the diaphragm 38 sticking to the respective surfaces of the regions 145 and 146 as a result of the movements thereof due to the above-mentioned pressure waves.

The region 146 of the space 54 is in communication with a reservoir for the ink (not shown in the drawings) by way of a hole 61 in the cover 53 and a flexible conduit 62 connected to the hole 61 by means of a screw threaded connection 63. The latter is provided with a circular seat 64 for receiving a filter 65 for filtering the ink. The filter 65 is formed by a pellet of porous material, for example stainless steel powder which has been sintered after having been compresssed so as to give a density of about 4.5 $g/cm^3$. The purpose of the filter 65 is to prevent impurities from passing into the space 54 and to prevent accidental sudden emptying of the tubes 12 in the event of a temporary increase in the depression in the ink.

Figure 2:
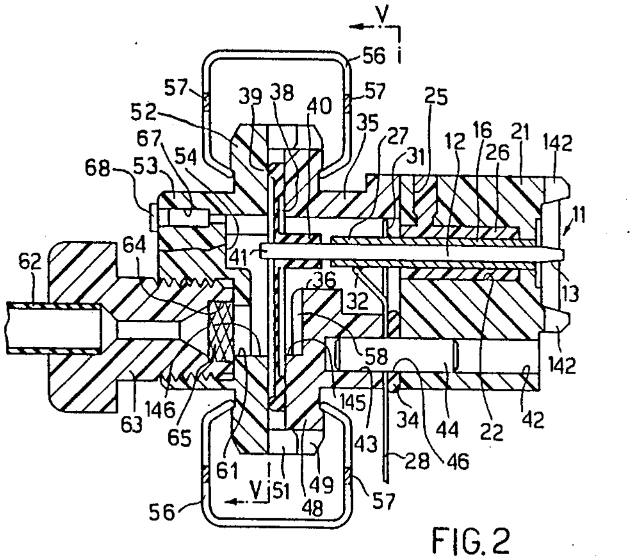
FIG. 2 is a view in section taken along lie II—II in FIG. 1.

Finally the space 54 is provided with an extension 66 (see FIG. 5) disposed at one of the upper corners of the space, in which an air purge hole 67 is provided. The hole 67 is kept open to fill the space 54 with ink, after which it is plugged, for example by means of a silicone plug 68 (FIG. 2).

Figure 6:
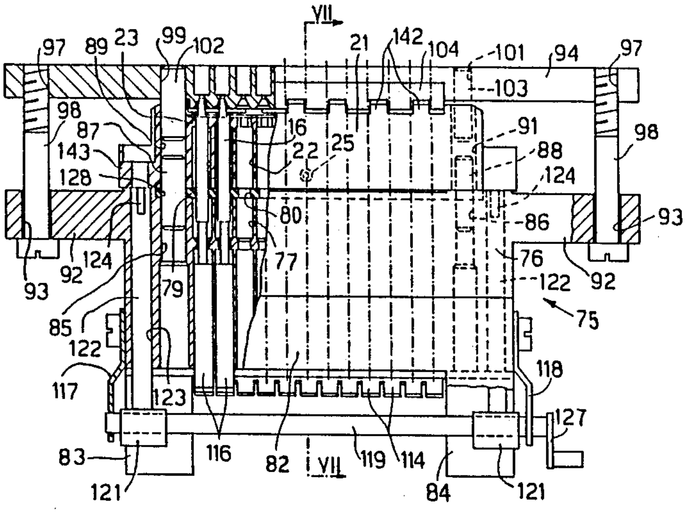
FIG. 6 is a partly sectional longitudinal view of an apparatus set up for the drillings of the head shown in FIG. 1.

For the purposes of producing the print head, use is made of an apparatus comprising a frame 75 (see FIG. 6) which has a body 76 of parallelepipedic shape. The body 76 is provided with a series of cylindrical holes 77 corresponding to the seats 22 of the body 21 of the head.

Figure 7:
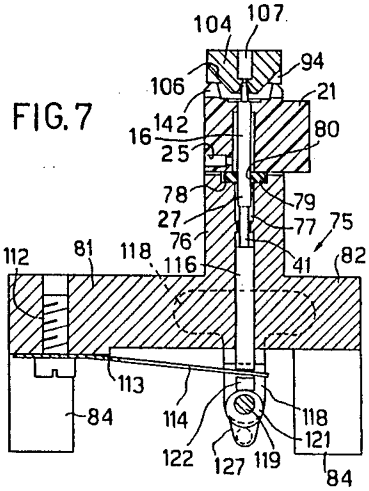
FIG. 7 is a view in section taken along line VII—VII in FIG. 6.
Figure 8:
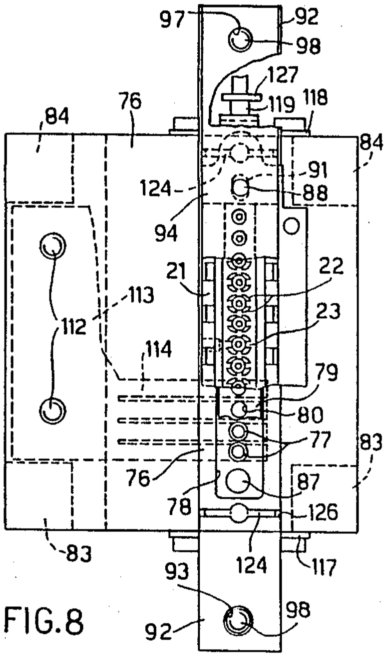
FIG. 8 is a partly sectional plan view of the apparatus shown in FIG. 6.

The upper surface of the body 76 is provided with a recess 78 (see FIGS. 7 and 8) in which the upper ends of the holes 77 are disposed and on which a seal or mask 79 of silicone rubber is positioned. The mask 79 is provided with a series of holes 80 whose diameter is the same as that of the transducers 16 and which are disposed in positions corresponding to the holes 77. The mask 79 serves as a support for the bottom surface of the body 21 while the holes 80 serve to accommodate the portions 27 of the transducers 16 in such a way that the seats 22 of the body 21 are closed downwardly.

The frame 75 further comprises two lateral bodies 81 and 82 (see FIG. 7) integral with the body 76 to form a larger support base for the apparatus 75 on two pairs of legs 83 and 84 which are fixed with respect to the bodies 81 and 82. The body 76 is provided with a pair of holes 85 and 86 (see FIG. 6) for accommodating two reference pins 87 and 88 for the body 21 of the head. The latter is in turn provided with a reference hole 89 for engagement of the pin 87 and a slot 91 for engagement of the pin 88 so as to be positioned with the row of seats 22 precisely aligned with the holes 77.

Two lateral projection portions 92 of the body 76 are provided with two holes 93 to permit the connection to the body 75 of a transverse member as generally indicated at 94 for locking the body 21. The transverse member 94 is of a rectangular shape corresponding to the top surface of the body 76. Provided at the two ends of the transverse member 94 are two screw threaded holes 97 which are aligned with the holes 93 in the body 76 and which can receive two fixing screws 98. The member 94 is finally provided with two reference holes 99 and 101 which can be aligned with the hole 89 and the slot 91 in the body 21 and receive two reference pins 102 and 103.

The frame 75 and the transverse member 94 are made of a rigid material whose coefficient of expansion is substantially the same as that of the body 21. In particular the material used is brass while the body 21 is formed of Macrolon resin with the addition of an amount of glass of the order of 30% so as to give a coefficient of expansion which is substantially the same as that of the brass.

At a position corresponding to the recess 78 in the body 76, the transverse member 94 carries a portion 104 (see FIG. 7) of greater thickness than the lateral parts thereof, but with side walls 106 which are inclined at 45°. Disposed on the axis of symmetry of the portion 104 is a series of holes 107 each of which is capable of positioning a capillary tube 12 of the print head, with a very high degree of accuracy.

Figure 9:
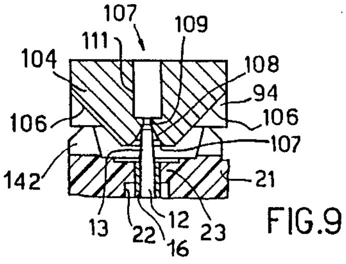
FIG. 9 is a view of a detail from FIG. 7 on an enlarged scale.

In particular, each hole 107 comprises a lower portion 108 (see FIG. 9) which is substantially conical for receiving as required the tapering portion 13 of the capillary tube 12. The portion 108 terminates at its upper end with a cylindrical portion 109 of smaller diameter than the outside diameter of the end of the conical terminal portion 13 to receive and precisely centre the tube 12 in its seat 22. The hole 107 comprises a portion 111 of larger diameter to permit access to the lower portion 109 of the hole 107.

A comb member 113 of resilient metal material is fixed to the underside of the body 81 (see FIGS. 6 and 7) by means of screws 112. The comb member 113 comprises a series of blade portions 114 forming the same number of leaf springs against which as many small pistons 116 disposed in the holes 77 normally bear.

Finally, fixed to the two side surfaces of the body 76 are two supports 117 and 118 on which a rotary shaft 119 disposed perpendicularly to the holes 77 is mounted. Fixed on the shaft 119 are two eccentrics 121 with which two pistons 122 slidable in two holes 123 of the body 76 co-operate. At its upward end, each piston 122 carries a transverse member 124 (see also FIG. 8) which is slidable in a recess 126 in the body 76 and which is capable of acting against the underneath surface of the projection 143 of the hollow body 21. Fixed on an end of the shaft 119 which projects from the support 118 is a crank 127 for turning the shaft 119 by hand so as to actuate the pistons 122 by means of the eccentrics 121.

For assembly of the print head, the individual print elements 11 (see FIG. 1) which are formed by the capillary tubes 12 connected to the respective transducers 16 are first prepared. Then, the two reference pins 87 and 88 are inserted with a frictional fit in the holes 85 and 86 and two reference holes 128 in the mask 79 are fitted on to those pins, the mask 79 thus being disposed in the recess 78 in the body 76. Then, the body 21 of the print head is positioned on the mask 79, with the reference pins 87 and 88 being inserted into the hole 89 and the slot 91 respectively in the body 21. Each print element 11 is then fitted into the seat 22 in the body 21 and is pushed until the portion 27 of the transducer 16 is fitted into the hole 80 in the mask 79, and the lower end 41 of the tube 12 bears against the corresponding piston member 116. The upward ends of the transducers 16 remain inserted with a limited degree of precision between the four projections 23 of the seats 22 (see FIG. 4).

Then, the two reference pins 102 and 103 (see FIG. 6) are engaged with a frictional fit into the holes 99 and 101 in the transverse member 94 and the latter is positioned on the body 21 in such a way that the pins 102 and 103 are inserted into the hole 89 and the slot 91 respectively. The conical portion 108 of each hole 107 (see FIG. 9) then engages the conical portion 13 of the associated capillary tube 12.

The transverse member 94 (see FIG. 6) is now rigidly fixed to the frame 71 by means of the two screws 98. In that way the transverse member 94 which acts against the projections 142 of the body 21 presses the latter against the seal 79 which is compressed within certain limits. The conical holes 108 now accurately align the conical portions 13 and the capillary tubes 12 project downwardly so as to flex the blade portions 114, thus ensuring that the conical portions 13 remain in contact with the walls of the respective conical holes 108. The print elements 11 are thus held in the body 21 with a very high degree of accuracy, with the nozzles 14 precisely aligned and with their axes parallel.

Then, a low-viscosity epoxy resin, for example the resin which is marketed by Emerson and Cumming under the name Stycast is injected through the hole 25 (see FIG. 4). That resin then passes through the conduits 24 providing communications between the various seats 22 in the body 21, filling them with a thickness of resin as indicated at 26 in FIG. 1 until reaching the projections 23 at the ends of the seats 22. At the lower end the resin is contained by the mask 79. Metering of the resin can be effected by controlling the volume thereof, or by monitoring the top surface of the body 21 through the spaces between the projections 142 and terminating resin injection when the liquid resin issues between the projections 23 of the seats 22.

After the resin injection operation, the body 21 is left in a fixed condition between the frame 75 and the transverse member 94 for a predetermined period of time to permit complete polymerisation of the resin, for example twelve hours at room temperature. The transverse member 94 is then removed, with the pins 102 and 103. If the ends 13 of one or more tubes 12 remain sticking to the associated hole 108 (see FIG. 9), it is possible to use a pin against the edge of the nozzle 14 by way of the portion 111 of the associated hole 107 in the transverse member 94.

By actuating the crank 127 (see FIGS. 6 and 7), the shaft 119 is now rotated, together with the eccentrics 121. The eccentrics 121 then cause the piston members 122 to be displaced upwardly and they move the body 21 upwardly by means of the transverse member 124, while the blade portions 114 of the comb member 113 urge the piston members 116 and thus also the print elements 11 upwardly whereby the body 21 is separated from the body 76 together with the mask 79. The latter is finally removed by hand from the lower ends 27 of the transducers 16.

The two reference pins 44 (see FIGS. 2 and 4) are now fitted into the holes 42 in the body 21. The seal 34 and the strip 28 are positioned on the reference pins 44 by means of the respective holes 46 and 47. The conducting areas 29 and 30 of the strip 28 are thus brought into contact with the terminals of the conducting layers 17 and 18 on the transducers 16 (see FIGS. 2 and 3).

A zinc paste is now disposed on the lower ends 27 of the transducers 16 and on the strip 28. Then, the paste is caused to melt by means of a jet of hot air so as to solder the areas 29 and 30 to the terminals of the layers 17 and 18 on the transducers 16. The intermediate block 35 is then fitted on to the two pins 44 (see FIG. 2) and is then fixed to the body 21 by means of the screws 37. The diaphragm 38 is now positioned on the block 35, with the sleeve portions 40 of the diaphragm 38 being a press fit on to the ends 41 of the capillary tubes 12.

After the connection 63 carrying the filter 65 has been screwed on to the cover 53, the projections 51 of the cover 53 engage into the spaces 49 in the block 35. Finally, the two series of clip springs 56 are fitted to the two flanges 48 and 52, whereby the cover 53 is connected to the support 10 of the print head.

It will be clear therefore that, for the purposes of manufacture of the print head, the capillary tubes 12 are fitted into the body 21 and that the latter is fixed at the same time on an apparatus comprising the series of reference seats 108 in such a way that the nozzles 14 of the capillary tubes 12 are held in position with a very high degree of accuracy and that finally the resin 26 is injected into the body 21 so as to encase a portion of the respective transducers 16.

It will be apparent that the print head as described above and the apparatus for the production thereof may be the subject of various modifications and improvements without thereby departing from the scope of the invention. For example the capillary tubes 12 may be metal. In addition, the connection between the body 21 and the intermediate block 35 may be replaced by welding or soldering and by a glue. Finally the production apparatus may be without the eccentrics 121 and the operation of removing the body 21 from the frame 75 after the production operation can be carried out by pressing against the blade portions 114 with the fingers.

We claim:

1. A multi-nozzle ink jet print head having a plurality of capillary tubes of substantially rigid material, each one of said capillary tubes terminating at one end with a nozzle for ejecting ink droplets, a plurality of sleeve-type piezoelectric transducers each one fitted on an associated one of said capillary tubes, a hollow body for carrying a first portion of said transducers fitted on said capillary tubes, said first portion being adjacent to said one end and being enclosed in a single resin block capable of holding said transducers in a fixed position with respect to said hollow body, a second portion on each one of said transducers located adjacent the end of each capillary tube opposite said nozzle, and a plurality of pairs of conducting terminals associated with said transducers, each pair being located on the outside surface of said second portion and being electrically connected to a pair of electrically conducting layers provided on the inner surface and the outer surface of said first portion of the associated transducer, wherein the improvement comprises a hollow block for housing said second portion of said transducers outside said resin block, said block being capable of protecting said second portion of the transducers, a flexible printed circuit having a plurality of pairs of electrically conducting areas associated with said pairs of conducting terminals, said printed circuit having a plurality of apertures for being entered by the second portion of said transducers, the areas of each one of said pairs on said printed circuit being located on two opposite edges of a corresponding one of said apertures and being soldered to the associated pair of conducting terminals of the associated transducer, said printed circuit being gripped between said hollow body and said hollow block.

2. A head according to claim 1, wherein one area (29) of each pair is carried by a tongue (32) flexed to produce contact of the associated area (29) in an axially displaced position with respect to the contact of the other area (30).

3. A head according to claim 2, wherein the printed circuit (28) is gripped between the block (35) and the body (21) by way of a seal (34) of elastic, insulating material.

4. A head according to claim 3, characterised in that the capillary tubes (12) extend through a space (36) in the block (35), the block being sealingly closed by a resilient diaphragm (38) having a cylindrical seating (40) accommodating the end of each capillary tube (12) which is opposite to the respective nozzle (14).

5. A head according to claim 4, characterised in that the said ends of the capillary tubes (12) communicate with a common reservoir (54) for the ink, in a cover (53) which is connected to the block (35) in such a way as to grip the diaphragm (38) between flat edge portions of the cover and block.

6. A head according to claim 5, characterised in that the cover (53) is removably connected to the block (35) by means of a pair of resilient gripping members (56, 57).

7. A head according to claim 5 or 6, characterised in that the reservoir (54) is provided with an ink feed conduit (64) in which there is disposed a filter (65) of porous material for preventing the introduction of impurities and avoiding abrupt emptying of the ink from the reservoir.

8. A head according to claim 1, characterised in that the body (21) comprises a series of cylindrical seats (22) for the transducers (16), each seat having a portion (23) substantially in contact with the end of the transducer adjacent the respective nozzle (14), the body comprising a conduit (24) communicating between each cylindrical seat and the adjacent cylindrical seat at the end opposite to the nozzle, and a single hole (28) for the injection of the resin, disposed with its axis perpendicular to that of one of the seat as substantially in line with the respective communicating conduits (24).

9. Apparatus for manufacturing a multi-nozzle ink jet print head in which each nozzle is carried by a capillary tube of substantially rigid material on which a sleeve-type piezoelectric transducer is fitted, said head comprising a hollow body for carrying the capillary tubes, in which a first portion of the transducers is to be enclosed in a resin for holding the nozzles in a fixed position with respect to the hollow body, a flexible printed circuit having a series of pairs of areas soldered to two conducting terminals disposed on the outside surface of another portion of the transducers, and being gripped between the hollow body and a hollow block protecting the said other portions of the transducers, the body comprising a series of cylindrical seats for the transducers, each seat having a contacting portion substantially in contact with the end of the transducer adjacent the cylindrical seat at the end opposite to the nozzle, the body being provided with a single hole disposed with its axis perpendicular to that of one of the seat substantially in line with the respective communicating conduits, wherein said apparatus comprises a frame (76) having reference means (87, 88, 89, 91) for positioning the hollow body (21), the frame being capable of accommodating a sealing means (79) for closing the ends of the seats (22) of said hollow body which are opposite to the contact portions (23), the sealing means comprising a series of holes (80) for accommodating the said other portions (27) of the transducers (16), a transverse member (94) removably fixed to the frame to lock the hollow body to said frame and provided with a series of conical reference holes (109) for the end of the capillary tubes (12) carrying the nozzles (14).

10. Apparatus for manufacturing a multi-nozzle ink jet print head in which each nozzle is carried by a capillary tube of substantially rigid material on which a sleeve-type piezoelectric transducer is fitted, said head comprising a hollow body for carrying the capillary tubes, in which a first portion of the transducers is to be enclosed in a resin for holding the nozzles in a fixed position with respect to the hollow body, the body comprising a series of cylindrical seats for the transducers, each seat having a contacting portion substantially in contact with the end of the transducer adjacent the respective nozzle and a conduit (24) communicating between each cylindrical seat and the adjacent cylindrical seat at the end opposite to the nozzle, the body being provided with a single hole disposed with its axis perpendicular to that of one of the seats substantially in line which the respective communicating conduits, wherein said apparatus comprises a frame having reference means for positioning said hollow body, said frame being capable of accommodating a sealing means for closing the ends of said seats of said hollow body which are opposite to said contact portions, said sealing means comprising a series of holes for accommodating the said other portions of the transducers, and a transverse member removably fixed to said frame to lock said hollow body to said frame and provided with a series of conical reference holes for the ends of the capillary tubes carrying the nozzles, whereby said resin can be injected through said single hole of said hollow body while said tubes are locked in the correct position in said hollow body by said frame, said sealing means and said transverse member.

11. Apparatus according to claim 10 or 9, characterised in that, in association with each hole (80) of the sealing means (79), the frame (76) carries a cylindrical guide (77) for receiving a piston (116) for supporting the end of the capillary tube (12) which is opposite to the nozzle (14), resilient means (113, 114) being provided to cause the pistons to urge the tubes against the conical holes (109).

12. Apparatus according to claim 11, characterised in that the resilient means comprise a comb-like spring (113) fixed to the frame (76), and by means (119, 121, 122) actuable to remove the hollow body (21) with the capillary tubes (12) from the frame after the transverse member (94) has been removed.

13. Apparatus according to claim 12, characterised in that the said actuable means comprise at least one eccentric (121) carried by the frame (76) and capable of being rotated to engage the hollow body (21) by way of a piston (122).

* * * * *